United States Patent [19]

Wrzyszczynski

[11] Patent Number: 5,054,583
[45] Date of Patent: Oct. 8, 1991

[54] BEARING ARRANGEMENT WITH CENTRIFUGAL MIST LUBRICATION FLOW AND ISOLATE DEAD SHAFT CONDUCTIVE COOLING FLOW

[75] Inventor: Jack A. Wrzyszczynski, Rockford, Ill.

[73] Assignee: Sundstrand Corporation, Rockford, Ill.

[21] Appl. No.: 523,583

[22] Filed: May 15, 1990

[51] Int. Cl.⁵ .............................................. F01M 1/00
[52] U.S. Cl. ................................ 184/6.26; 184/104.1; 384/316; 384/476
[58] Field of Search ................. 184/6.26, 6.22, 6.12, 184/104.1, 104.3; 464/7; 384/466, 471, 476, 316, 321

[56] References Cited

U.S. PATENT DOCUMENTS

| | | | |
|---|---|---|---|
| 3,030,529 | 4/1962 | Jaeschke et al. | 184/6.22 |
| 3,135,353 | 6/1964 | Orsini | 184/6.12 |
| 3,276,827 | 10/1966 | Diver et al. | 384/467 |
| 3,706,483 | 12/1972 | Irwin | 384/448 |
| 3,722,967 | 3/1973 | Lewis | 384/466 |
| 3,746,129 | 7/1973 | Knapp et al. | 184/6.26 |
| 3,965,974 | 6/1971 | Sernetz et al. | 384/321 |
| 4,137,997 | 2/1979 | Ando | 184/6.22 |
| 4,222,705 | 9/1980 | Smith | 384/317 |
| 4,502,274 | 3/1985 | Girault | 184/6.26 |
| 4,511,016 | 4/1985 | Döell | 184/6.22 |
| 4,527,911 | 7/1985 | Davis | 384/471 |

FOREIGN PATENT DOCUMENTS 0685856 9/1979 U.S.S.R. .............................. 384/476

Primary Examiner—Ira S. Lazarus
Assistant Examiner—Alan B. Cariaso
Attorney, Agent, or Firm—Wood, Phillips, Mason, Recktenwald & Van Santan

[57] ABSTRACT

A cooling and lubricating system for use with a bearing assembly comprises a bearing having inner and outer races with interposed bearing elements, a rotary element requiring lubrication journaled for rotation by the bearing, an axially extending hollow shaft in heat exchange relation with the inner race and mounting the same, and a centrifugal pump for causing a mist of oil from the area of the rotary element to pass between the races to lubricate the interfaces of the races and the interposed bearing elements.

15 Claims, 1 Drawing Sheet

BEARING ARRANGEMENT WITH CENTRIFUGAL MIST LUBRICATION FLOW AND ISOLATE DEAD SHAFT CONDUCTIVE COOLING FLOW

FIELD OF THE INVENTION

This invention relates to a bearing arrangement, and more specifically, to a cooling and lubricating system for a bearing arrangement.

BACKGROUND OF THE INVENTION

Increased sophistication in high speed engines has resulted in the generation of high temperatures between meshed gears and their rotatable mounts, specifically, bearing assemblies. In order to reduce this heat, a flow of oil is applied to the gears and bearings to dissipate the heat as well as lubricate the interfaces of the components. As a result of the high speed operation of the components, conductively heated oil is churned and thereby further mechanically heated as it circulates about the bearing assembly. This oil tends to be the cause of excessive heating within the bearing. Thus, while oil may be a desirable coolant in many instances, churning resulting from direct contact with rotary elements diminishes its cooling efficiency.

In order to isolate a cooling flow of oil from rotating elements to avoid churning, a number of proposals have been disclosed. One prior art proposal, contained in U.S. Pat. No. 4,222,705 to Smith issued Sept. 16, 1980, includes the use of a heat conductive fluid trapped within a tapered annular cavity which, in turn, rotates with a housing structure. Due to centrifugal action, the fluid is repeatedly pumped to opposite ends of the cavity where it is alternatively vaporized and recondenses such that heat is transferred away from an inner bearing race. This self-contained design does not provide means for drawing the heated oil away from the bearing for external cooling, nor is the issue of lubrication addressed in any way.

Ando, U.S. Pat. No. 4,137,997, issued Feb. 6, 1979, discloses the use of cooling oil which is circulated about an outer race of spindle bearings by means of circumferential cooling passages and pressure lubrication of the bearing by means of an isolated flow of lubricating oil. Ando does not show cooling of an inner bearing race nor means of simply pumping the lubricating flow through the bearing.

One arrangement has been proposed in which an inner bearing race is mounted on a hollow sleeve which, in turn, defines an internal cavity extending axially along a shaft. U.S. Pat. No. 3,706,483 to Irwin discloses such a structure. The cavity is filled with a heat conductive material which draws heat away from the inner bearing race and toward heat dissipating fins. Lubrication of the bearing is not provided for.

In order to both dissipate heat within the bearing assembly and provide a lubricating flow without risk of inducing excess heating, one could imagine utilizing a single flow of oil and limiting the amount of oil admitted within the bearing, thereby allowing the excess oil to provide a cooling wash to the outside of the assembly while subjecting only a minimal flow of oil to the rotating bearing elements. One approach would be to provide lubricating passages of reduced dimension, whereby the amount of oil admitted with the bearing is restricted. Test results indicate that in order to reduce the dimension of such passages to a level at which excessive churning is effectively precluded, the passages would necessarily be reduced to a dimension at which oil passing therethrough would easily plug the orifice. The resulting lack of lubrication could result in catastrophic failure of the machine. Hence, such a solution is not practical.

The present invention is directed to overcoming one or more of the above problems.

SUMMARY OF THE INVENTION

It is the principal object of the invention to provide a new and improved bearing construction. More specifically, it is an object of the invention to provide a bearing construction that is ideally suited for use in gearboxes that may be employed in high speed machines.

An exemplary embodiment of the invention achieves the foregoing objects in a cooling and lubricating system for use with a bearing assembly including bearings having inner and outer races with interposed rotary elements, a source of oil, a means of circulating the oil from the source in a path which is in heat exchange relation with one of the races, with the path being isolated from the interposed rotary elements, and a means for causing a mist of oil from the source passed between the races to lubricate the interfaces of the races and the interposed rotary elements.

As a result of the foregoing construction, isolated flows of oil may be applied to the bearing arrangement. A low volume lubricating mist is churned about the interposed rotary elements, while a cooling flow is circulated in heat exchange relation with the inner bearing races in an isolated path to avoid churning.

According to another facet of the invention, there is provided a cooling and lubricating system having a plurality of bearings with inner and outer races and interposed rotary elements concentrically mounted about an axial extending hollow inner passageway, such that the passageway is in heat exchange relation with the inner races of the bearings The system comprises a source of oil with means for directing the oil from the source to the inner passageway. Centrifugal pump means are provided which cause a mist of oil to pass between the bearing races to lubricate the interfaces of the races and the interposed rotary elements.

In a preferred embodiment, the hollow inner passageway is a stationary shaft and is in fluid isolation from the interposed rotary elements.

According to still another facet of the invention, there is provided a cooling and lubricating system for use with a bearing assembly having inner and outer races with interposed bearing elements, a rotary element requiring lubrication journaled for rotation by the bearing, an axially extending hollow shaft in heat exchange relation with the inner race and mounting the same, and a tank in which cooling and lubricating oil is stored. This system further includes means for cooling oil in the tank, means for directing oil from the tank (a) into the hollow shaft and (b) at the rotary element, with the interior of the shaft being isolated from the interposed bearing elements. Centrifugal pump means are provided for causing a mist of oil from the area near the rotary elements to pass between the bearing races to lubricate the inner faces of the races and the interposed bearing elements. Means are provided for circulating oil from the tank to the cooling means and for circulating oil from the bearing assembly to the tank.

In a preferred embodiment, the centrifugal pump means comprises a pump formation on at least one of the rotary elements or the outer bearing race and in fluid communication with an area proximate the bearing elements.

In one form of the invention, the pumping formation is disposed intermediate two axially spaced bearings.

In one embodiment the pump formation is a radially directed aperture extending through at least one of the rotary elements or the outer bearing race.

The invention also envisions a lubrication pump adjacent the tank, and a heat exchanger intermediate the lubrication pump and the bearing assembly.

In a highly preferred embodiment, a scavenger pump is disposed intermediate the tank and the bearing assembly for circulating oil from the bearing assembly to the tank and is adapted to accommodate unrestrained overflow of oil from the hollow shaft.

Other objects and advantages will become apparent from the following specification taken in connection with the accompanying drawings.

DESCRIPTION OF THE PREFERRED EMBODIMENT

An exemplary embodiment of a cooling and lubricating system for a bearing construction made according to the invention is illustrated in the figures in combination with a gearbox, since that is the preferred use of the system. However, it should be understood that the cooling and lubricating system for use with a bearing assembly may find use in other environments and should not be restricted to gearbox applications except to the extent set forth in the appended claims.

Figure 1:
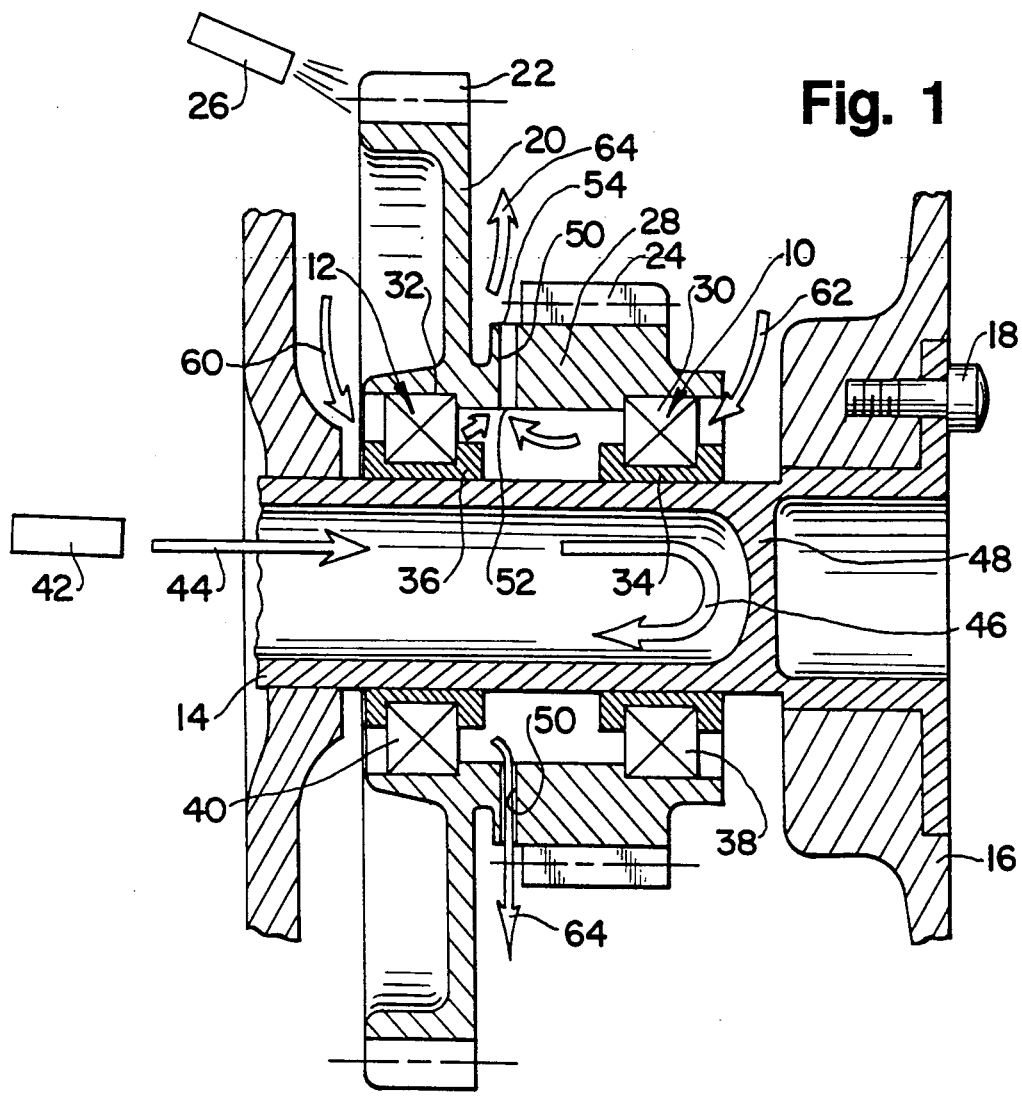
FIG. 1 is a sectional view of a bearing construction made according to the invention.

Referring to FIG. 1, the cooling and lubricating system of the invention includes axially spaced bearing assemblies, generally designated 10 and 12, disposed on a hollow shaft 14. The shaft 14 is stationary and may be mounted to a transmission case 16, or the like, by machine screws 18 (only one of which is shown).

A gear 20 is journaled for rotation on the shaft 14 by means of the bearings 10 and 12. The gear includes gear teeth 22 and 24, which are meshed with other gears (not shown) in the machine for the usual power transmission purposes. One or more spray nozzles 26 are directed at the teeth 22 and 24 to spray lubricating oil thereon, primarily for lubricating purposes and secondarily, to cool the gear 20. As is well known, the result will be the generation of a fine mist of oil within the casing 16 as a result of the impingement of drops of oil on the teeth 22 and 24 as the latter are rotating about the axis of the shaft 14.

The gear 20 includes an integral hub 28 which, in turn, includes integral outer races 30 and 32 for the bearings 10 and 12, respectively. However, it is to be understood that the outer races 30 and 32 could be formed separately from the hub 28 and mounted thereto in suitable recesses as by press or shrink fitting. The particular mechanical arrangement is not of great moment to the present invention except that the outer races 30 and 32 must rotate in unison with the hub 28.

Ringlike inner races 34 and 36 are provided for each of the bearings 10 and 12 and are disposed in fixed relation on the shaft 14 at axially spaced locations in alignment with respect of ones of the outer races 30 and 32. A plurality of rotary bearing elements 38 and 40 are interposed between the respective inner and outer races of each of the bearings 10 and 12. As is well known, the rotary bearing elements 38 may take on any of a variety of configurations, such as spheres, tapered rollers, etc., which will be spaced somewhat circumferentially about the shaft 14.

To provide for cooling of the bearings 10 and 12, a nozzle 42 is adapted to spray oil in the direction of an arrow 44 into the interior of the hollow shaft 14. Such oil will reverse its direction, as shown by an arrow 46, upon encountering a blind end 48 of the shaft 14 and will flow back through the interior of the shaft 14 to a sump and ultimately to a tank. It will be noted that the oil from the nozzle 42 is isolated from the rotary elements and, thus, does not churn and generate the problems mentioned earlier. At the same time, heat generated during operation of the machine will be conducted through the bearings 10 and 12 to the shaft 14 to be absorbed thereat by the cooling oil.

To provide for lubrication of the bearings 10 and 12 during operation of the machine, which will include rotation of the gear 20 about the shaft 14, the hub 28, at the location between the outer races 30 and 32, includes a plurality of generally radially directed bores 50. The bores 50 define a rotary pump of the centrifugal type. Thus, the radially inner ends 52 of the bores 50 serve as pump inlets, while the radially outer ends 54 serve as pump outlets.

Stated another way, during operation of the machine, which will necessarily cause rotation of the gear 20 and its hub 28, gas, typically air, within the bores 50 will rotate with the gear 20. The resulting centrifugal force will cause the gas to exit bores 50 which, in turn, will create a low pressure area near the inlet ends 52 and bores 50. The mist within the case 16 generated as a result of operation of the spray nozzle 26 will be drawn in the direction of arrows 60 and 62 through the sides of the bearings 10 and 12 remote from the bores 50 and pass between the rotary bearing elements 38 and 40 to the low pressure area. Such mist will, of course, enter the bores 50 and centrifugal force acting thereon as the gears 20 rotate will cause the mist to be expelled in the direction of an arrow 64.

Needless to say, as the mist passes between the races and the rotary bearing elements of the bearings 10 and 12, it will lubricate, and to a lesser degree, cool the interface of the rotating components. Thus, lubrication of the bearings 10 and 12 is achieved without churning of the oil.

While the pumping formations, or bores, are shown as being located in the hub 28 of the gear 20, those skilled in the art will appreciate that, if the outlet ends 54 are not obstructed, the bores could be located in an extension of an outer race for one or the other of the bearings 10 and 12.

In the preferred embodiment the bores 50 are located between two axially spaced bearings 10 and 12. The purpose of this construction is to provide paths for the oil mist to the inlet ends 52 of the bores 50 that are of equal resistance. This, in turn, assures that there will be approximately equal oil flows through the bearings 10 or 12. However, in those instances where machine design prevents fluid communication from the interior of the casing 16 to the bores 50 without passing through bearings on one side of a gear or the like so as to prevent short-circuiting of the mist flow, which could result in lubricant starvation at a single bearing, the passages 50 need not be disposed between bearings. For example, if the right-hand end of the hub 28 were not journaled by the bearing 10 but were rotating in close proximity to a wall of the casing 16 to form a gross labyrinth seal or the like, proper lubrication of the bearing 12 would nonetheless be obtained.

Figure 2:
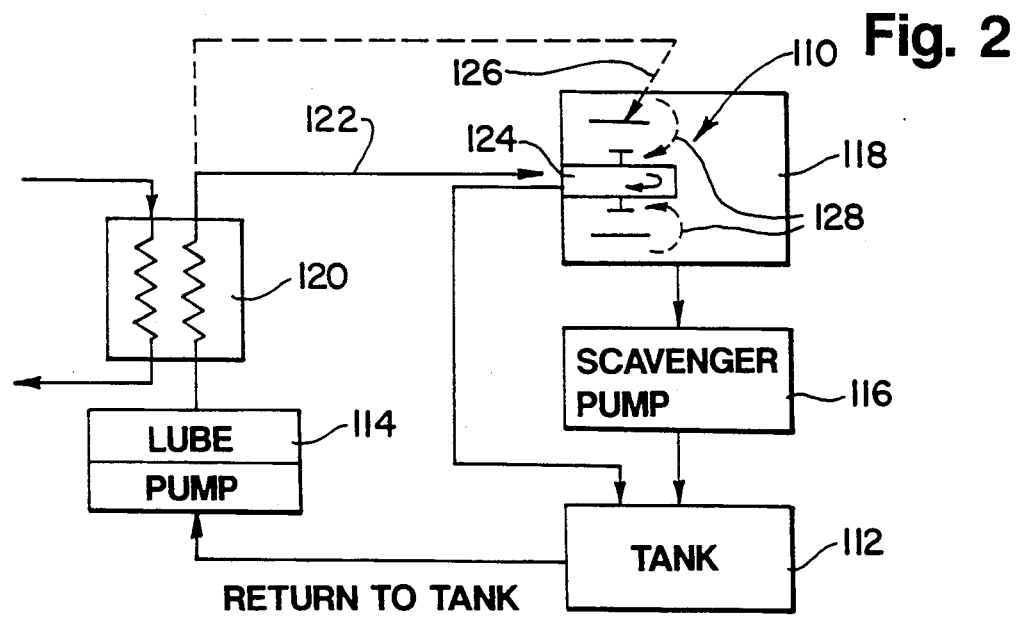
FIG. 2 is a schematic view of a bearing cooling and lubricating system embodying the bearing construction shown in FIG. 1.

A preferred embodiment of a cooling and lubricating system for a bearing construction is shown schematically in FIG. 2. A bearing construction like that just described is shown generally at 110 and has a tank 112 for storing lubricating and cooling oil. A lube pump 114 is provided downstream of the tank 112, which acts to circulate oil from the tank 112 to the bearing assembly 110. A scavenger pump 116 is provided intermediate the tank 112 and bearing assembly 110 and acts to pump oil from a housing 118 containing the bearing assembly 110 and into the tank 112. A heat exchanger 120 is disposed intermediate the lube pump 114 and bearing assembly 110 to cool the heated oil pumped therethrough.

A conductive cooling flow, as represented by the arrow 122, is injected into a hollow inner passageway 124 of the bearing assembly 110. As the cooling flow is circulated about the passageway, the flow is heated and is allowed to passively discharge from the passageway. An oil mist is generated within the housing 118 through operation of a nozzle 126 (corresponding to the nozzle 26 in FIG. 1) spraying oil on a rotary machine element. A lubricating flow of oil, as represented by the arrow 128, is centrifugally pumped through the bearing assembly 110 by a method as discussed previously.

The scavenger pump 116 draws the heated oil mist away from the bearing assembly. Due to the isolation of the cooling flow into the passageway 124 from the lubricating flow in the form of the mist, the cooling flow is precluded from similar expansion and thereby does not further extend the volumetric requirements of the scavenger pump. The reduced scavenger pump requirements provide a lower cost circulation system.

I claim:

1. A cooling and lubricating system for use with a bearing assembly comprising:
   bearings having inner and outer races with interposed rotary elements;
   an axially extending hollow inner passageway in heat exchange relation with one of said races;
   a source of oil;
   means for directing oil from said source to said hollow passageway;
   means for generating a mist of oil from said source; and
   centrifugal pump means rotatable with at least one of said outer races for causing said mist of oil to pass between said races to lubricate the interfaces of said races and said interposed rotary elements.

2. The cooling and lubricating system of claim 1 wherein said hollow inner passageway is a stationary shaft.

3. The cooling and lubricating system of claim 2 wherein said stationary shaft is in fluid isolation from said interposed rotary elements.

4. A cooling and lubricating system for use with a bearing assembly comprising:
   a bearing having inner and outer races with interposed bearing elements;
   a rotary element requiring lubrication journaled for rotation by said bearing and adjacent said outer races;
   an axially extending hollow shaft in heat exchange relation with said inner race and mounting the same;
   a tank in which cooling and lubricating oil is stored;
   means for cooling the oil in said tank;
   means for directing oil from said source into said hollow shaft, the interior of said shaft being isolated from said interposed bearing elements;
   means for impinging oil from said source against said rotary element to generate a mist of oil in the area of said rotary elements;
   centrifugal pump means on one side of outer race and said rotary element for causing said mist of oil from the area of said rotary element between said races to lubricate the interfaces of said races and said interposed bearing elements;
   means for circulating oil from said tank to said cooling means; and
   means for circulating oil from said bearing assembly to said tank.

5. The cooling and lubricating system of claim 4 wherein said pumping formation is disposed intermediate two axially spaced bearings.

6. The cooling and lubricating system of claim 4 wherein said centrifugal pumping formation comprises a radial aperture extending through said rotary element and in fluid communication with an area proximate said bearing elements.

7. The cooling and lubricating system of claim 4 wherein said means for circulating oil from said tank to said cooling means comprises a lubrication pump intermediate said tank and said bearing assembly.

8. The cooling and lubricating system of claim 7 wherein said cooling means comprises a heat exchanger intermediate said lubrication pump and said bearing assembly.

9. The cooling and lubricating system of claim 4 wherein said means for circulating from said bearing assembly to said tank comprises a scavenger pump intermediate said tank and said bearing assembly.

10. The cooling and lubricating system of claim 9 wherein said scavenger pump is adapted to accommodate the unrestrained overflow of oil from said hollow shaft.

11. The cooling and lubricating system of claim 4 wherein said means for directing oil from said source into said hollow shaft is a cooling jet adjacent said shaft, and wherein said means for directing oil from said source at said rotary element is a lubricating jet disposed adjacent said rotary element.

12. A cooling and lubricating system for use with a bearing assembly comprising:
   bearings having inner and outer races with interposed bearing elements;
   a source of oil;
   means for circulating oil from said source in a path in heat exchange relation with one of said races, said path being isolated from said interposed rotary elements;
   a rotary machine element on said outer race; and
   a rotary pump means on one of said outer race and said machine element.

13. The cooling and lubricating system of claim 12 wherein there are two said bearings in axially spaced relation and said rotary pump means axially located between said bearings.

14. The cooling and lubricating system of claim 13 wherein said rotary pump means has a radially outer outlet and a radially inner inlet between said bearings to define a centrifugal pump operable upon rotation of said machine element and said outer race to draw a mist of oil between the races of both said bearings.

15. A cooling and lubricating system for use with a bearing assembly comprising:

bearings having inner and outer races with interposed bearing elements;

an axially extending hollow inner passageway in heat exchange relation with one of said races, said hollow inner passageway being in fluid isolation from said interposed rotary elements;

a source of oil;

means for directing oil from said source to said hollow passageway;

means for generating a mist of oil from said source; and centrifugal pump means rotatable with at least one of said outer races for causing said mist of oil to pass between said races to lubricate the interfaces of said races and said interposed rotary elements.

* * * * *